(12) United States Patent
Olson et al.

(10) Patent No.: US 11,968,301 B2
(45) Date of Patent: Apr. 23, 2024

(54) DECENTRALIZED ASSET IDENTIFIERS FOR CROSS-BLOCKCHAIN NETWORKS

(71) Applicant: International Business Machines Corporation, Armonk, NY (US)

(72) Inventors: Timothy Olson, Port Orchard, WA (US); Petr Novotny, Mount Kisco, NY (US); Nitin Gaur, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 17/016,843

(22) Filed: Sep. 10, 2020

(65) Prior Publication Data

US 2022/0078010 A1  Mar. 10, 2022

(51) Int. Cl.
| | | |
|---|---|---|
| H04L 9/30 | (2006.01) | |
| H04L 9/00 | (2022.01) | |
| H04L 9/06 | (2006.01) | |
| H04L 67/104 | (2022.01) | |

(52) U.S. Cl.
CPC .............. *H04L 9/30* (2013.01); *H04L 9/0643* (2013.01); *H04L 67/1044* (2013.01); *H04L 9/50* (2022.05)

(58) Field of Classification Search
None
See application file for complete search history.

(56) References Cited

U.S. PATENT DOCUMENTS

| | | |
|---|---|---|
| 10,298,585 B1 | 5/2019 | Treat et al. |
| 10,587,413 B1 * | 3/2020 | Todd ................. H04L 9/50 |
| 2002/0083003 A1 * | 6/2002 | Halliday ........... G06Q 30/04 705/52 |
| 2017/0237554 A1 | 8/2017 | Jacobs et al. |
| 2018/0189887 A1 | 7/2018 | Goldstein |
| 2019/0172026 A1 | 6/2019 | Vessenes et al. |
| 2019/0238327 A1 | 8/2019 | Li et al. |

(Continued)

FOREIGN PATENT DOCUMENTS

| | | | |
|---|---|---|---|
| CN | 111988149 | * | 8/2020 |
| WO | 2019055585 A1 | | 3/2019 |

OTHER PUBLICATIONS

Unknown, "Cryptoasset Taxonomy Report", Crypto Compare, 2018, 79 pages.

(Continued)

*Primary Examiner* — Taghi T Arani
*Assistant Examiner* — Joshua Raymond White
(74) *Attorney, Agent, or Firm* — Stosch Sabo

(57) ABSTRACT

Described are techniques for generating and employing decentralized asset identifiers for cross-blockchain network asset transfers, the techniques including registering a decentralized asset identifier to an asset with a local asset identifier, where the decentralized asset identifier is immutable. The techniques further include endorsing a proposed transaction for transferring the asset from a first controller associated with a first blockchain network to a second controller associated with a second blockchain network, where the proposed transaction utilizes the decentralized asset identifier. The techniques further include exchanging, in a document associated with the decentralized asset identifier and retrieved from an identity network, the first controller for the second controller.

20 Claims, 9 Drawing Sheets

(56) References Cited

U.S. PATENT DOCUMENTS

| | | | |
|---|---|---|---|
| 2019/0289019 A1 | 9/2019 | Thekadath et al. | |
| 2020/0090188 A1* | 3/2020 | Wince et al. | |
| 2020/0092114 A1* | 3/2020 | Androulaki | H04L 9/088 |
| 2020/0145223 A1* | 5/2020 | Yang | H04L 63/08 |
| 2020/0403789 A1* | 12/2020 | Murdoch | H04L 9/0662 |
| 2021/0374730 A1* | 12/2021 | Todd | H04L 9/50 |

OTHER PUBLICATIONS

Unknown, "Financial Instrument Global IdentifierR (FIGITM)", Object Management Group, v1.0, Nov. 2015, 52 pages.

Unknown, "About", OpenFIGI, printed May 26, 2020, 2 pages.

Subramanian, H., "Decentralized Blockchain-Based Electronic Marketplaces", Communications of the ACM, Jan. 2018, vol. 61, No. 1, pp. 78-84.

Mell et al., "The NIST Definition of Cloud Computing", Recommendations of the National Institute of Standards and Technology, Sep. 2011, 7 pages.

* cited by examiner

DECENTRALIZED ASSET IDENTIFIERS FOR CROSS-BLOCKCHAIN NETWORKS

BACKGROUND

The present disclosure relates to blockchain networks, and, more specifically, to decentralized asset identifiers for asset transfers between different blockchains.

A blockchain can refer to a list of linked records (referred to as blocks), where each block can contain a cryptographic hash of a previous block, a timestamp, and transaction data, and/or other data. A blockchain can be managed by a peer-to-peer network of nodes, and modifications to the blockchain can be authenticated by self-interested collaboration between the peer-to-peer network of nodes.

SUMMARY

Aspects of the present disclosure are directed toward a computer-implemented method for generating and employing decentralized asset identifiers for cross-blockchain asset transfers. The method comprises registering a decentralized asset identifier to an asset with a local asset identifier, where the decentralized asset identifier is immutable. The method further comprises endorsing a proposed transaction for transferring the asset from a first controller associated with a first blockchain network to a second controller associated with a second blockchain network, where the proposed transaction utilizes the decentralized asset identifier. The method further comprises exchanging, in a document associated with the decentralized asset identifier and retrieved from an identity network, the first controller for the second controller.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
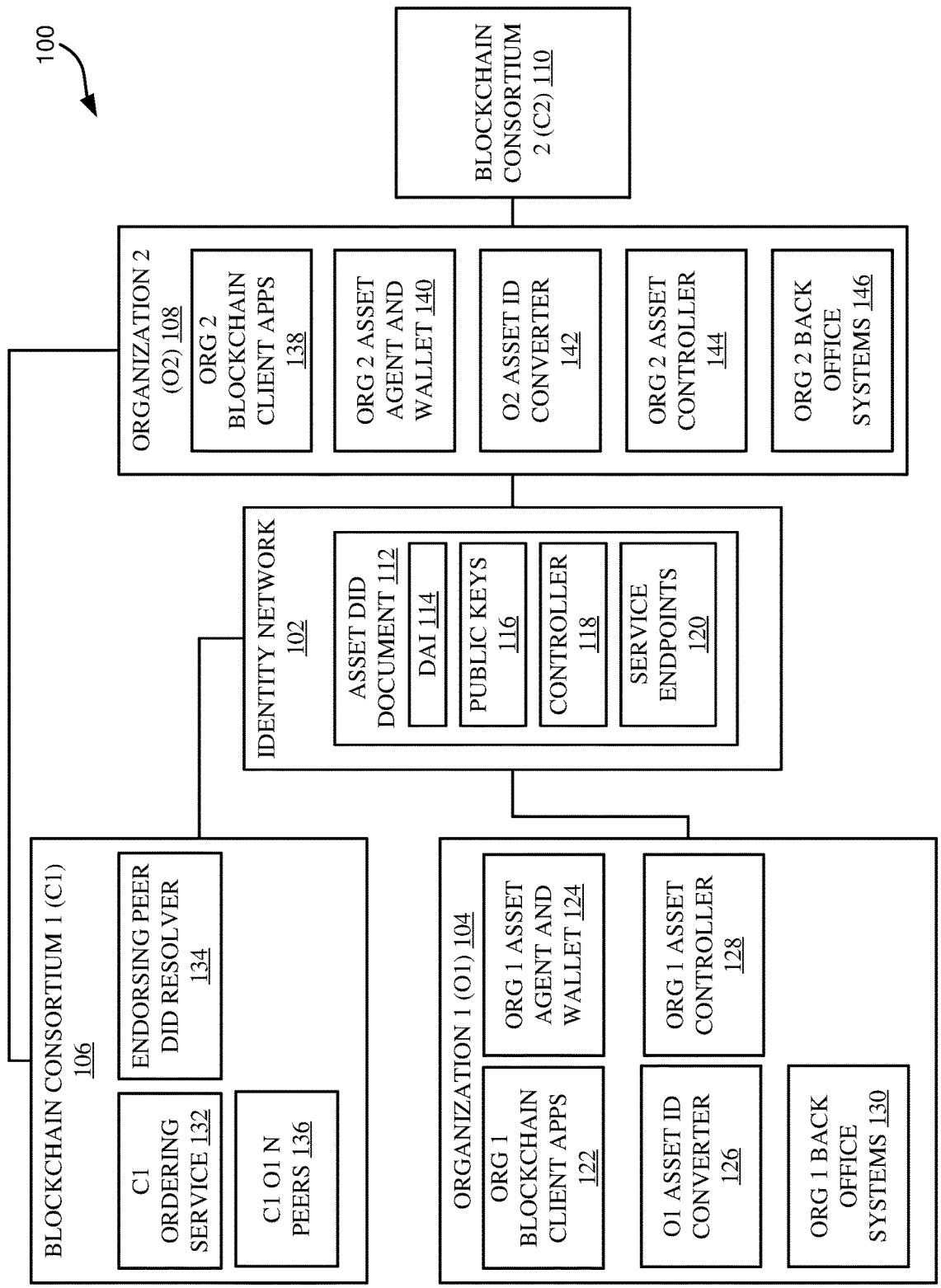
FIG. 1 illustrates a block diagram of multiple blockchain networks, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward blockchain networks, and, more specifically, to decentralized asset identifiers for asset transfers between different blockchains. While not limited to such applications, embodiments of the present disclosure may be better understood in light of the aforementioned context.

As blockchain becomes increasingly prevalent, assets are increasingly transferred across multiple blockchain networks. However, it can be difficult to trace an asset's lifecycle when it is transferred across multiple blockchain networks. For example, when transferred across multiple blockchain networks, an asset can be associated with numerous different organization-specific identifiers (e.g., as generated by back-end business systems) and/or consortium-specific identifiers. Accordingly, as an asset is transferred across multiple blockchain networks, it becomes increasingly difficult to reliably document the lifecycle of the transferred asset. These challenges of tracing the full lifecycle of a transferred asset can lead to degraded provenance.

Aspects of the present disclosure are directed to overcoming the aforementioned technical challenge of end-to-end provenance for assets transferred across multiple blockchain networks by utilizing an independent, portable, and trusted decentralized asset identifier (DAI). In some embodiments, the decentralized asset identifier can be associated with a World Wide Web Consortium (W3C) Anywise Decentralized Identifier (DID) document. In some embodiments, the decentralized asset identifier can be registered on a permissioned distributed ledger technology (DLT) identification network (e.g., Hyperledger® Indy, Sovrin®, etc.). The decentralized asset identifier can be associated with an asset throughout the life of the asset regardless of changes in the blockchain managing the asset. Although aspects of the present disclosure are generally discussed with respect to using a decentralized asset identifier for accurately documenting transactions between different blockchain networks, the decentralized asset identifier can also be used for intra-blockchain consortium transactions as well. In other words, any transaction on an asset (whether inter-blockchain or intra-blockchain) can be done using the decentralized asset identifier as the primary key.

Furthermore, aspects of the present disclosure can utilize smart contracts and/or endorsement policies configured to verify and/or validate transactions that transfer the legal responsibility (e.g., ownership, control) for an asset between different blockchain networks. For example, when utilizing a DID document in combination with a decentralized asset identifier, aspects of the present disclosure can verify that the controller attribute and the authentication/authorization attributes in the asset's cryptographically secured DID document are properly updated. Once the changes to the DID document of an asset are finalized, it is cryptographically impossible for the old asset owner/controller to manipulate the transferred asset's DID document.

A decentralized asset identifier provides numerous benefits. For one, a decentralized asset identifier can be independent of its context throughout its lifecycle. In other words, the decentralized asset identifier can be independent of ownership and/or possession changes, independent of blockchain networks implementing ownership transfers, and independent of the type of asset that is being transacted. Accordingly, decentralized asset identifiers provide a universal identifier that can be utilized by a variety of blockchain networks for maintaining asset provenance while transferring assets between different blockchain networks.

As a second example benefit, aspects of the present disclosure include techniques for transferring an asset's digital identity (e.g., control of its private keys) together with the legal responsibility (e.g., ownership) of the asset using the decentralized asset identifier. Accordingly, aspects of the present disclosure enable secure asset transfers between different blockchain networks using decentralized asset identifiers.

As a third example benefit, aspects of the present disclosure improve asset provenance for assets that undergo one or more inter-blockchain transfers. In other words, all asset state changes through an asset's lifecycle can be keyed to an immutable decentralized asset identifier regardless of the type, configuration, protocols, or number of blockchain networks that transact the asset.

As a fourth example benefit, aspects of the present disclosure can generate the decentralized asset identifier without using any identifying attribute of the asset itself. In other words, the decentralized asset identifier can be asset-agnostic which can be beneficial for ensuring privacy and/or anonymity of the asset.

As a fifth example benefit, aspects of the present disclosure can generate and utilize decentralized asset identifiers that are self-sovereign. In other words, in some embodiments, no third-party registration authority is required the create and/or issue the decentralized asset identifier.

Referring now to FIG. 1, illustrated is a computational environment for cross-blockchain asset transfers 100, in accordance with some embodiments of the present disclosure. The computational environment for cross-blockchain asset transfers 100 includes an identity network 102, a first organization (O1) 104, a first blockchain consortium (C1) 106, a second organization (O2) 108, and a second blockchain consortium (C2) 110.

The identity network 102 can be, for example, a DLT-based identity network. The identity network 102 can include an asset DID document 112. The asset DID document 112 can be, for example, a document similar to or consistent with a W3C DID document. The asset DID document 112 can include information such as, but not limited to a decentralized asset identifier 114, public keys 116 associated with the asset, a controller 118 owning the asset, service endpoints 120 which operate on behalf of an asset, and/or authorization and delegation methods for the asset.

The first organization 104 includes O1 blockchain client apps 122, an O1 asset agent and wallet 124, an O1 asset ID converter 126, an O1 asset controller 128, and O1 back office systems 130. The O1 blockchain client apps 122 can be blockchain applications implemented by the first organization 104 for any number and variety of purposes. O1 asset agent and wallet 124 can include computer-executable functionality for performing key management operations using an asset's private keys. O1 asset ID converter 126 can be configured to associate a local asset identifier with a decentralized asset identifier 114 on the identity network 102. O1 asset controller 128 can refer to the controller, owner, and/or entity that is legally responsible for a given asset. The O1 back office systems 130 can refer to company, department, or organization-specific computer systems, protocols, computer programs, and so on that form the electronic infrastructure of a given company, department, or organization.

The first blockchain consortium (C1) 106 can be configured to manage a blockchain utilized by the first organization 104. The first blockchain consortium (C1) includes a C1 ordering service 132, an endorsing peer DID resolver 134, and C1 O1 N peers 136. The C1 ordering service 132 can be configured to receive transactions, order the transactions into blocks, and distribute blocks to nodes in the blockchain. The endorsing peer DID resolver 134 can be configured to look up a decentralized asset identifier 114 on the identity network 102 and retrieve its associated asset DID document 112, thereby enabling trusted authentication and communication. The endorsing peer DID resolver 134 can be configured to verify, for example, that (i) the asset is associated with a non-revoked decentralized asset identifier 114; (ii) the asset is managed by the correct controller; and/or (iii) the asset DID document 112 (or information therein) is provided to any required smart contract functionality. The C1 O1 N peers 136 can refer to n peer nodes for managing a blockchain associated with the first organization 104 and the first blockchain consortium 106.

The second organization (O2) 108 can include similar components as the first organization 104. Namely, the second organization 108 can include O2 blockchain client apps 138, an O2 asset agent and wallet 140, an O2 asset ID converter 142, an O2 asset controller 144, and an O2 back office systems 146. Likewise, the second blockchain consortium (C2) 110 can include similar components as the first blockchain consortium 106, but these components are not explicitly shown for simplicity.

The computational environment for cross-blockchain asset transfers 100 can be utilized for various functions including, but not limited to, (i) registering an asset to a controller (e.g., O1 asset controller 128 or O2 asset controller 144); (ii) associating a local asset identifier with a corresponding decentralized asset identifier 114; (iii) resolving decentralized asset identifiers 114 in any received transaction proposals; and/or (iv) modifying a controller (e.g., O1 asset controller 128 or O2 asset controller 144) of an asset using a decentralized asset identifier 114 as part of a cross-blockchain asset transfer. These and other aspects of the present disclosure are discussed in more detail hereinafter with respect to FIGS. 2-6.

Figure 2:
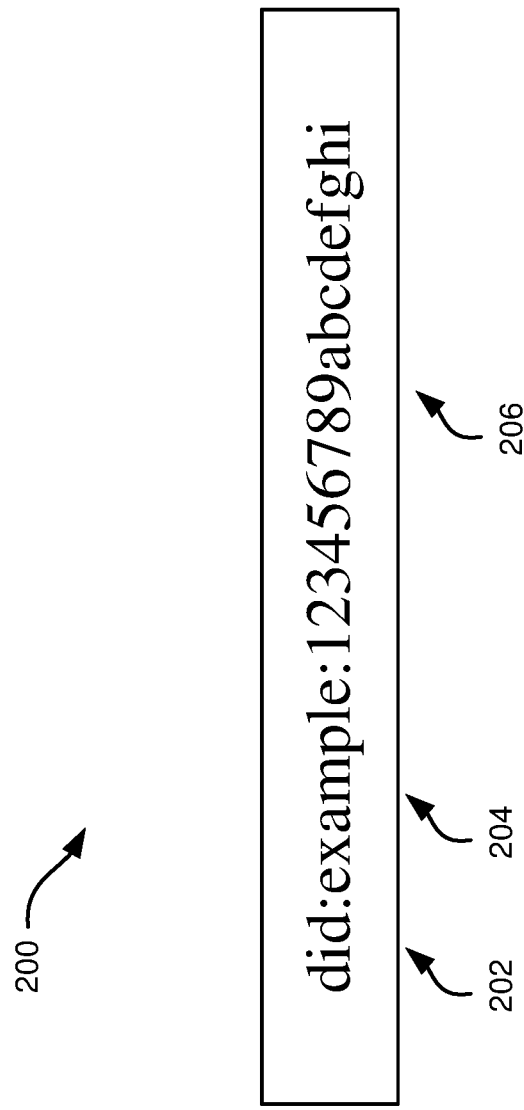
FIG. 2 illustrates a diagram of an example decentralized asset identifier, in accordance with some embodiments of the present disclosure.

Referring now to FIG. 2, illustrated is an example decentralized asset identifier 200, in accordance with some embodiments of the present disclosure. In some embodiments, the decentralized asset identifier 200 is consistent with, for example, the decentralized asset identifier 114 illustrated in FIG. 1.

The decentralized asset identifier 200 can include a scheme 202, a method 204, and a method-specific identifier 206. The scheme 202 can refer to a Universal Resource Locator (URL) scheme identifier. For example, the scheme 202 references DID, or the W3C DID specification. The method 204 can refer to a method of how a specific scheme 202 (e.g., DID scheme) is implemented to work with a specific verifiable data registry. The method 204 can be defined by a method specification (e.g., a DID method specification) which can specify the operations by which decentralized asset identifiers are created, resolved, and deactivated and/or the protocols by which asset DID documents are written and updated. Finally, the method-specific identifier 206 can be an alphanumeric sequence that is unique to a given asset. The method-specific identifier 206 can be generated by any number of algorithms or mechanisms including, but not limited to, hashing algorithms. While the method-specific identifier 206 may be based on or derived from identifying information of the asset, the method-specific identifier 206 does not itself include any identifiable information of the asset. As an example, the method-specific identifier 206 may be a hash value of a vehicle identification number (VIN). In this example, although the method-specific identifier 206 is based on identifying information of the asset (e.g., the VIN), the identifying information is not represented in the method-specific identifier 206 insofar as the identifying information cannot be inferred from or reconstructed from the method-specific identifier 206. In other embodiments, the method-specific identifier 206 is not based on any underlying information of the asset at all but is instead a randomly generated alphanumeric number.

Figure 3:
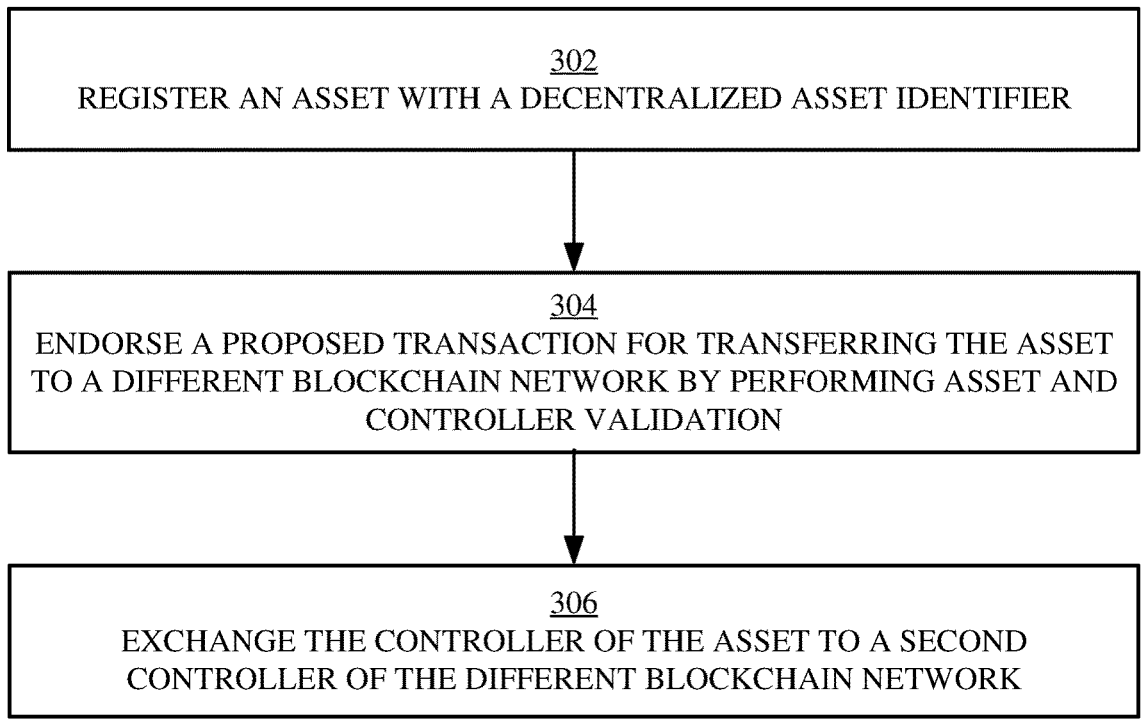
FIG. 3 illustrates a flowchart of an example method for utilizing decentralized asset identifiers for cross-blockchain asset transfers, in accordance with some embodiments of the present disclosure.

FIG. 3 illustrates a flowchart of an example method 300 for utilizing decentralized asset identifiers for cross-blockchain asset transfers, in accordance with some embodiments of the present disclosure. The method 300 can be implemented by, for example, one or more components of the computational environment for cross-blockchain asset transfers 100, a processor, a computer, or another configuration of hardware and/or software.

Operation 302 includes registering an asset with a decentralized asset identifier. In some embodiments, the decentralized asset identifier is immutable. In some embodiments, the decentralized asset identifier is based on a local asset ID of the asset or other characteristics of the asset. Nonetheless, in some embodiments, identifying information of the asset (e.g., a type of asset) cannot be inferred from, deduced from, or derived from the decentralized asset identifier. In some embodiments, the asset is owned by a first controller of a first blockchain network in operation 302. Operation 302 is discussed in more detail hereinafter with respect to FIG. 4.

Operation 304 includes endorsing a proposed transaction for transferring the asset to a different blockchain network by performing asset and controller validation. Advantageously, transferring the asset between blockchains using the decentralized asset identifier can improve provenance of the asset insofar as the decentralized asset identifier can be used by both blockchains, thereby improving traceability of the asset. In situations without a decentralized asset identifier, a first blockchain may transfer an asset to a second blockchain using a first local identifier, and the second blockchain can store the transferred asset using a second local identifier, thereby causing degraded provenance of the asset.

In some embodiments, operation 304 includes correlating local asset identifiers with decentralized asset identifiers in a proposed transaction. In such embodiments, an asset ID converter can be configured to map any locally generated or used asset identifiers (e.g., as utilized by a backend business system) to a corresponding decentralized asset identifier (e.g., as retrieved from an identity network). After correlating any local asset identifier to the corresponding decentralized asset identifier, any blockchain client application that creates and/or submits transaction proposals to a blockchain endorsing node can be configured to utilize the decentralized asset identifier for any asset transactions that it processes. Operation 304 is discussed in more detail hereinafter with respect to FIG. 5.

Operation 306 includes exchanging the controller of the asset to a second controller of the different blockchain network in response to endorsing the proposed transaction in operation 304. In some embodiments, the exchange is made in a document associated with the asset such as an asset DID document. Operation 306 is discussed in more detail hereinafter with respect to FIG. 6.

Figure 4:
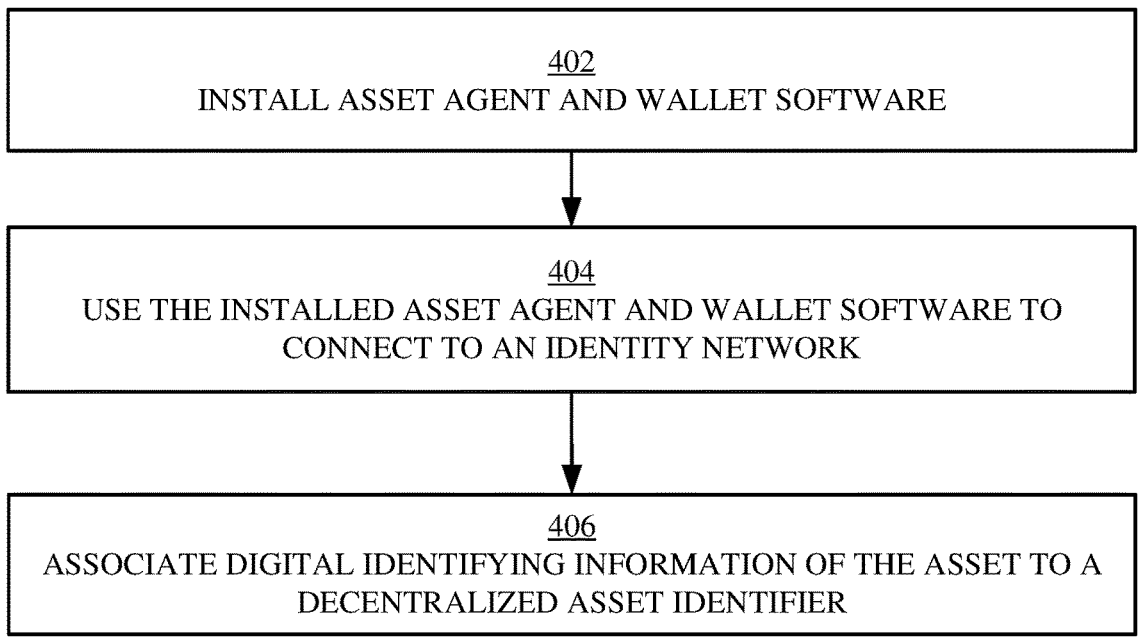
FIG. 4 illustrates a flowchart of an example method for registering an asset to a controller with a decentralized asset identifier, in accordance with some embodiments of the present disclosure.

FIG. 4 illustrates a flowchart of an example method 400 for registering an asset to a controller with a decentralized asset identifier, in accordance with some embodiments of the present disclosure. The method 400 can be implemented by, for example, one or more components of the computational environment for cross-blockchain asset transfers 100, a processor, a computer, or another configuration of hardware and/or software. In some embodiments, the method 400 is a sub-method of operation 302 of FIG. 3.

Operation 402 includes installing an asset agent and wallet software on a controller associated with a blockchain network. In some embodiments, the asset agent and wallet software is configured to access, store, and/or utilize private keys and/or other credentials for an asset.

Operation 404 includes using the installed asset agent and wallet software to connect the controller to an identity network (e.g., a DLT-based identity network such as Hyperledger® Indy).

Operation 406 includes associating digital identifying information of the asset to a decentralized asset identifier on the identity network. In some embodiments, the digital identifying information includes an asset DID document. In some embodiments, the unique private and public key pairs of the asset are generated using the installed asset agent and wallet software. In some embodiments, the private keys remain securely stored within the wallet portion of the installed asset agent and wallet software. In some embodiments, the asset's decentralized asset identifier and digital identifying information (e.g., asset DID document) are immutably written to the identity network. An asset DID document can include, for example, the decentralized asset identifier of the asset, the public keys of the asset, an identity of the asset's controller, authentication and authorization attributes for identifying which entities can make which types of modifications to the asset DID document, service endpoints through which information and/or actions regarding the asset can be communicated, and the like.

Figure 5:
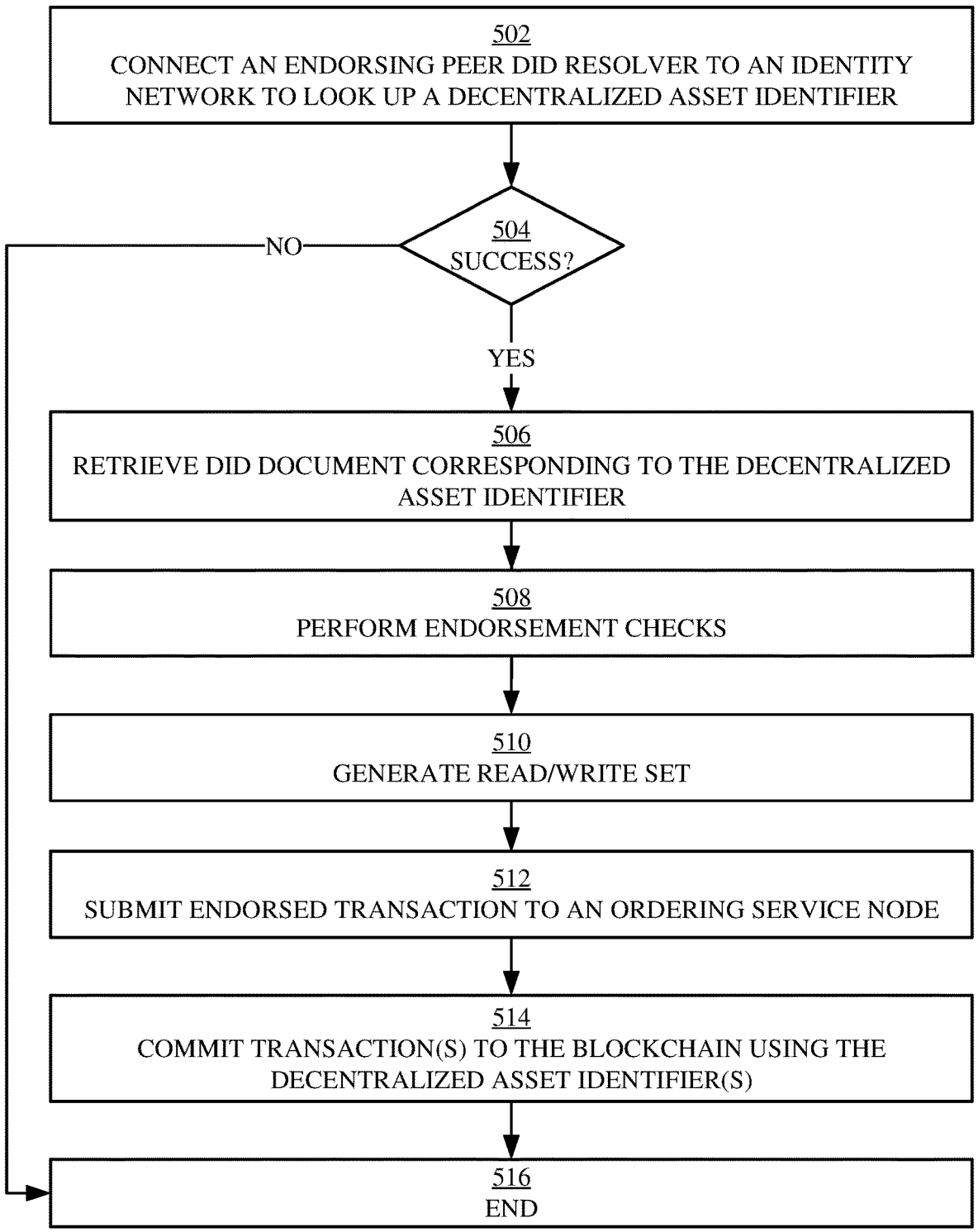
FIG. 5 illustrates a flowchart of an example method for resolving a decentralized asset identifier, in accordance with some embodiments of the present disclosure.

FIG. 5 illustrates a flowchart of an example method 500 for resolving a decentralized asset identifier, in accordance with some embodiments of the present disclosure. The method 500 can be implemented by, for example, one or more components of the computational environment for cross-blockchain asset transfers 100, a processor, a computer, or another configuration of hardware and/or software. In some embodiments, the method 500 is a sub-method of operation 304 of FIG. 3.

Operation 502 includes connecting an endorsing peer DID resolver to an identity network in order to look up a decentralized asset identifier. Operation 504 includes determining whether the endorsing peer DID resolver is able to successfully retrieve the decentralized asset identifier. If not (504: NO), then the method 500 proceeds to operation 516 and ends. If so (504: YES), then the method 500 proceeds to operation 506 and retrieves the asset DID document corresponding to the decentralized asset identifier. The information in the retrieved asset DID document can be used for any additional endorsement policy enforcement associated with the transaction proposal.

Operation 508 includes performing endorsement checks. Operation 510 includes generating a read/write set in response to successfully performing the endorsement checks. In some embodiments, operations 508 and/or 510 can be further configured to include additional logic for checking parameters in an asset DID document and/or associated identified service endpoints. For example, such additional logic can include logic configured to ensure an identified controller is the expected controller, verifying an attribute of an asset via a service endpoint to ensure that it meets a business requirement, and/or other additional logic.

Operation 512 includes submitting, by a blockchain client application, the endorsed transaction to an ordering service node. In some embodiments, the blockchain client application collects a plurality of endorsements and performs endorsement validation on the plurality of endorsements before submitting the endorsed transaction to the ordering service node.

Operation 514 includes committing the transaction(s) to the blockchain using the decentralized asset identifier(s). The method then ends at operation 516.

Figure 6:
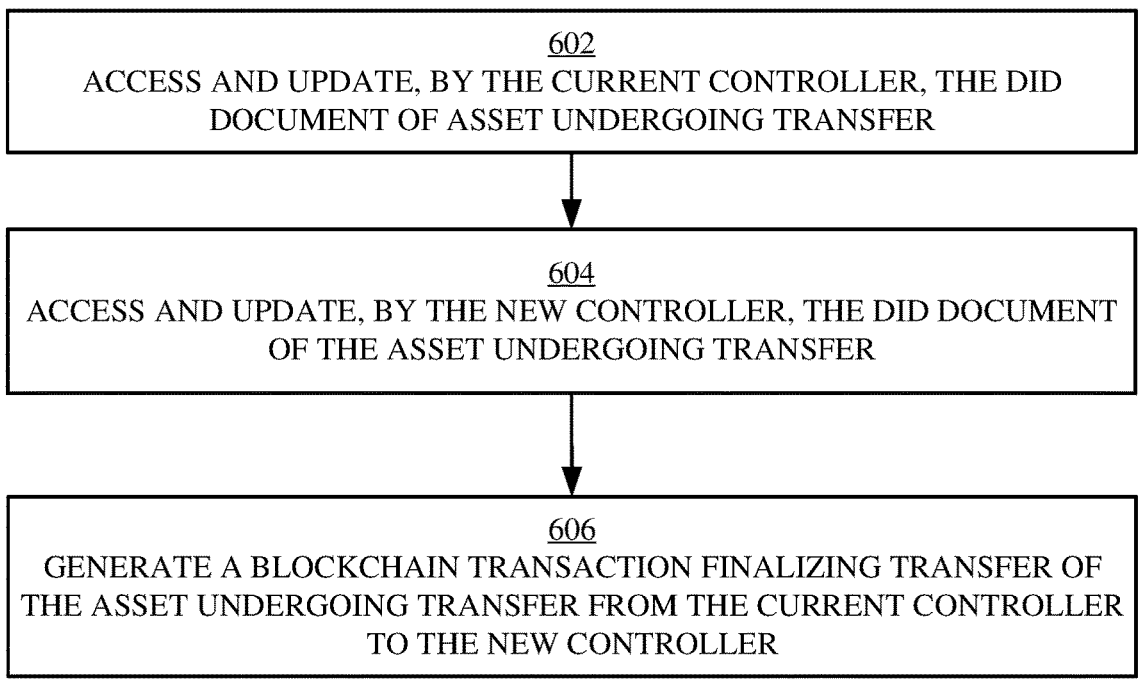
FIG. 6 illustrates a flowchart of an example method for changing a controller of an asset using a decentralized asset identifier, in accordance with some embodiments of the present disclosure.

FIG. 6 illustrates a flowchart of an example method 600 for changing a controller of an asset using a decentralized asset identifier, in accordance with some embodiments of the present disclosure. The method 600 can be implemented by, for example, one or more components of the computational environment for cross-blockchain asset transfers 100, a processor, a computer, or another configuration of hardware and/or software. In some embodiments, the method 600 is a sub-method of operation 306 of FIG. 3.

Operation 602 includes accessing and updating, by the current controller, the asset DID document of the asset undergoing transfer. In some embodiments, operation 602 includes the current controller authenticating to the asset DID document and updating controller attributes (e.g., changing from the current controller to the new controller), authentication attributes, and/or authorization attributes to reflect the new controller. For example, operation 602 can include the first controller making authorization updates that enable the second controller to modify the asset DID document. In some embodiments, operation 602 populates the asset DID document of the asset undergoing transfer with the public keys of the new controller.

Operation 604 includes accessing and updating, by the new controller, the DID document of the asset undergoing transfer. In some embodiments, operation 604 includes the new controller authenticating to the asset DID document and making any other necessary changes. During operation 604, the previous controller (original controller) no longer has access to the asset DID document of the asset undergoing transfer.

Operation 606 includes generating a blockchain transaction finalizing the transfer of the asset undergoing transfer from the current controller to the new controller. In some embodiments, smart contract logic can be configured to verify that the controller and/or other attributes of the asset DID document of the asset undergoing transfer are correctly updated before finalizing the blockchain transaction.

Figure 7:
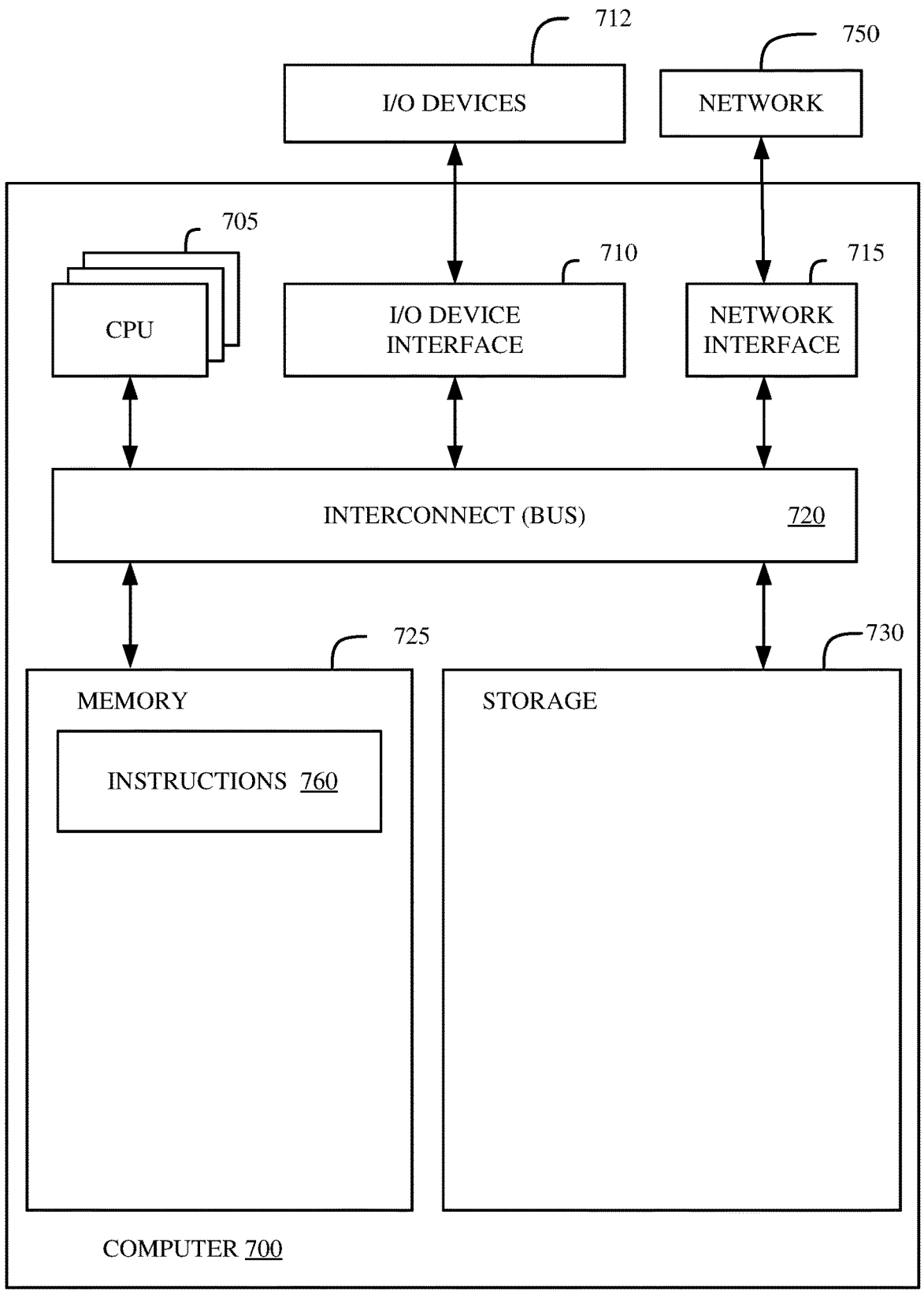
FIG. 7 illustrates a block diagram of an example computer, in accordance with some embodiments of the present disclosure.

FIG. 7 illustrates a block diagram of an example computer 700 in accordance with some embodiments of the present disclosure. In various embodiments, computer 700 can perform any or all of the methods described in FIGS. 3-6 and/or implement the functionality discussed in one or more of FIGS. 1-2. In some embodiments, computer 700 receives instructions related to the aforementioned methods and functionalities by downloading processor-executable instructions from a remote data processing system via network 750. In other embodiments, computer 700 provides instructions for the aforementioned methods and/or functionalities to a client machine such that the client machine executes the method, or a portion of the method, based on the instructions provided by computer 700. In some embodiments, the computer 700 is incorporated into (or functionality similar to computer 700 is virtually provisioned to) one or more entities of the computational environment for cross-blockchain asset transfers 100 and/or other aspects of the present disclosure.

Computer 700 includes memory 725, storage 730, interconnect 720 (e.g., BUS), one or more CPUs 705 (also referred to as processors herein), I/O device interface 710, I/O devices 712, and network interface 715.

Each CPU 705 retrieves and executes programming instructions stored in memory 725 or storage 730. Interconnect 720 is used to move data, such as programming instructions, between the CPUs 705, I/O device interface 710, storage 730, network interface 715, and memory 725. Interconnect 720 can be implemented using one or more busses. CPUs 705 can be a single CPU, multiple CPUs, or a single CPU having multiple processing cores in various embodiments. In some embodiments, CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random-access memory (e.g., static random-access memory (SRAM), dynamic random-access memory (DRAM), or Flash). Storage 730 is generally included to be representative of a non-volatile memory, such as a hard disk drive, solid state device (SSD), removable memory cards, optical storage, or flash memory devices. In an alternative embodiment, storage 730 can be replaced by storage area-network (SAN) devices, the cloud, or other devices connected to computer 700 via I/O device interface 710 or network 750 via network interface 715.

In some embodiments, memory 725 stores instructions 760. However, in various embodiments, instructions 760 are stored partially in memory 725 and partially in storage 730, or they are stored entirely in memory 725 or entirely in storage 730, or they are accessed over network 750 via network interface 715.

Instructions 760 can be computer-readable and computer-executable instructions for performing any portion of, or all of, the methods of FIGS. 3-6 and/or implementing the functionality discussed in any portion of FIGS. 1-2. Although instructions 760 are shown in memory 725, instructions 760 can include program instructions collectively stored across numerous computer-readable storage media and executable by one or more CPUs 705.

In various embodiments, I/O devices 712 include an interface capable of presenting information and receiving input. For example, I/O devices 712 can present information to a user interacting with computer 700 and receive input from the user.

Computer 700 is connected to network 750 via network interface 715. Network 750 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
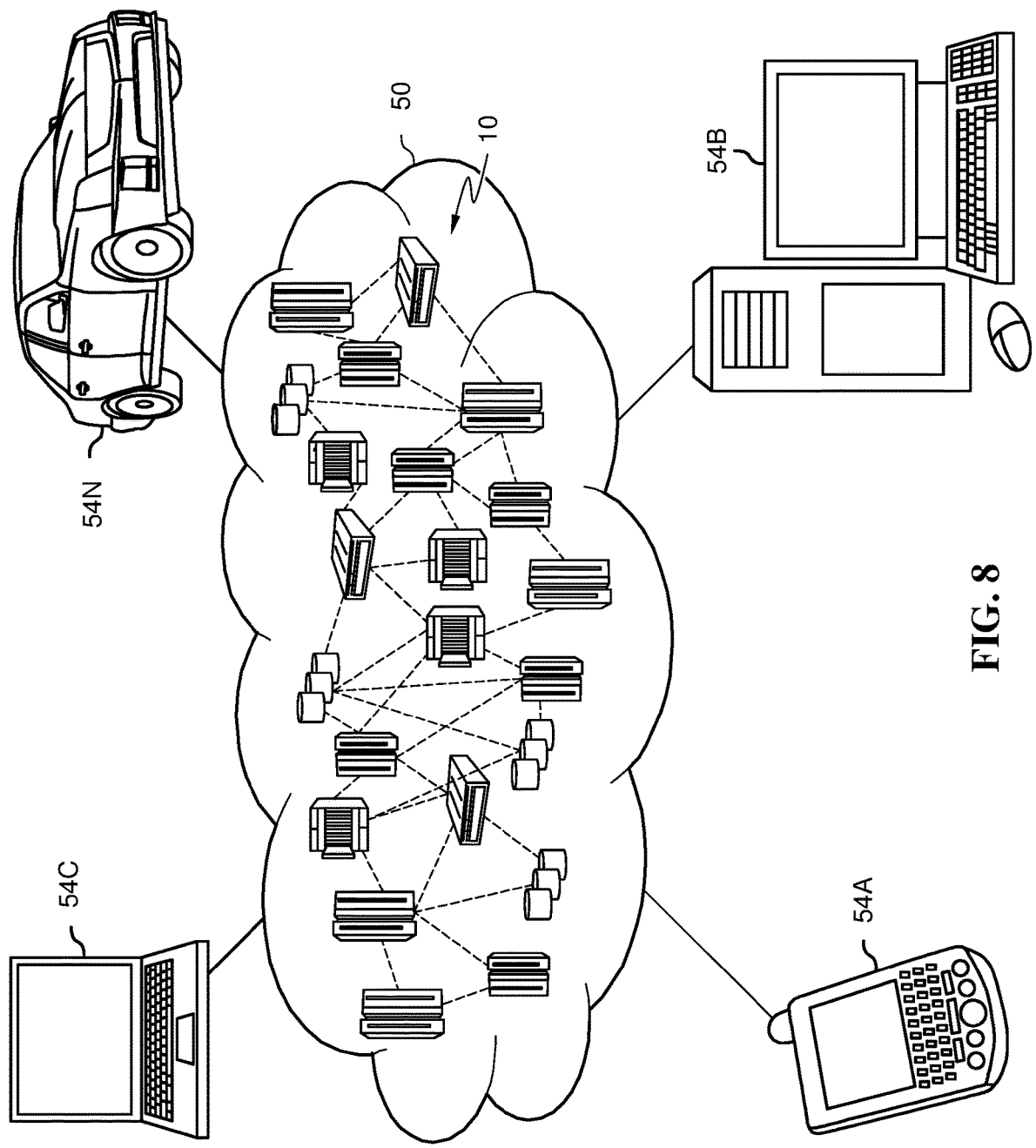
FIG. 8 depicts a cloud computing environment, in accordance with some embodiments of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
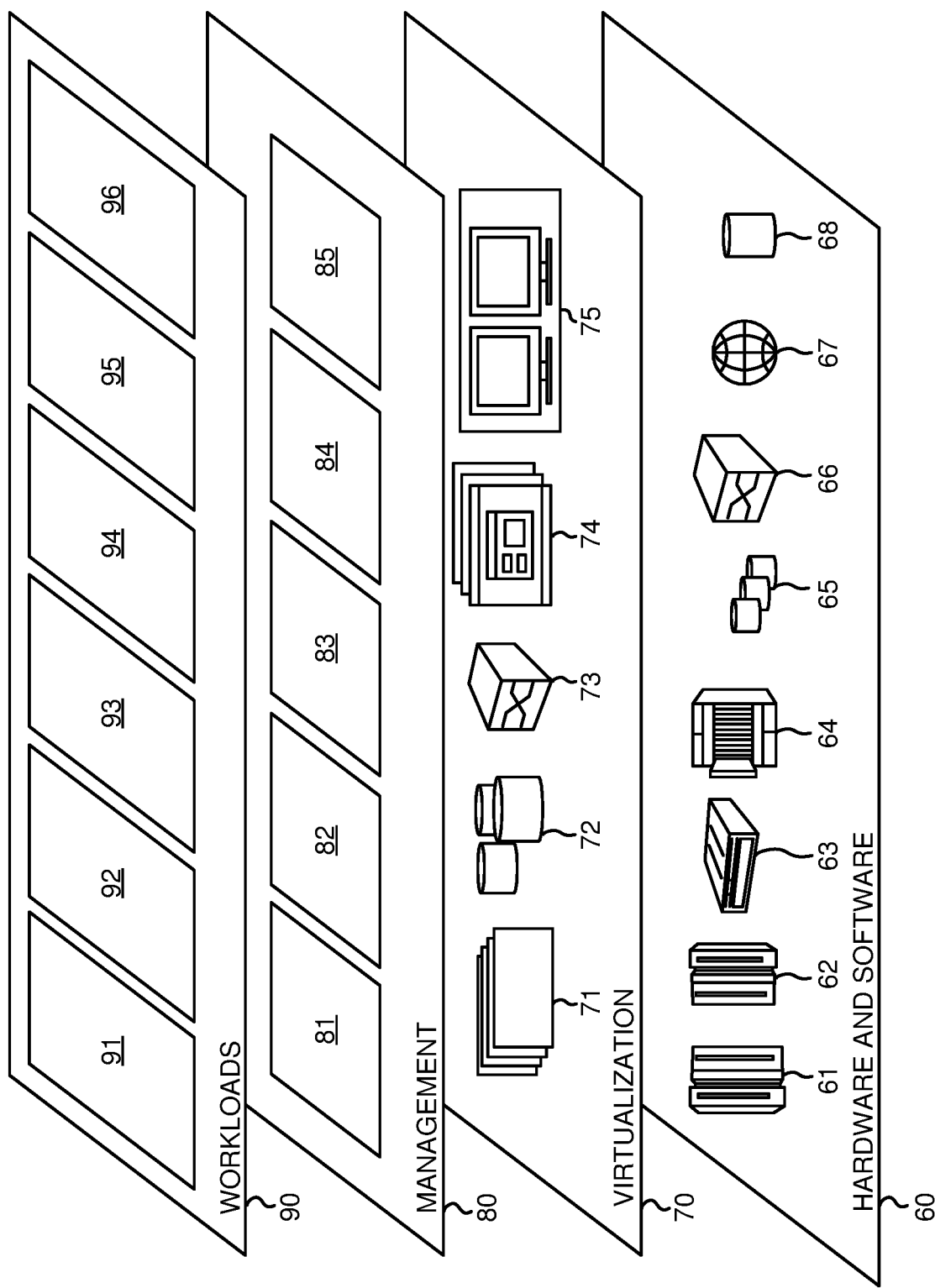
FIG. 9 depicts abstraction model layers, in accordance with some embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and decentralized asset identifiers for cross-blockchain asset transfers 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 760 of FIG. 7 and/or any software configured to perform any portion of the methods described with respect to FIGS. 3-6 and/or implement any portion of the functionality discussed in FIGS. 1-2) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method for generating and employing decentralized asset identifiers for cross-blockchain network asset transfers, the method. The method includes registering a decentralized asset identifier to an asset with a local asset identifier, wherein the decentralized asset identifier is immutable; endorsing a proposed transaction for transferring the asset from a first controller associated with a first blockchain network to a second controller associated with a second blockchain network, wherein the proposed transaction utilizes the decentralized asset identifier; and exchanging, in a document associated with the decentralized asset identifier and retrieved from an identity network, the first controller for the second controller.

Example 2 includes the method of example 1, including or excluding optional features. In this example, the decentralized asset identifier comprises a scheme portion, a method portion, and a method-specific identifier.

Example 3 includes the method of any one of examples 1 to 2, including or excluding optional features. In this example, characteristics of the asset cannot be inferred from the decentralized asset identifier.

Example 4 includes the method of any one of examples 1 to 3, including or excluding optional features. In this example, the document associated with the decentralized asset identifier includes a public key, a controller identifier, and one or more service endpoint identifiers, and authorization and delegation methods for the asset.

Example 5 includes the method of any one of examples 1 to 4, including or excluding optional features. In this example, registering the decentralized asset identifier further comprises: installing asset agent and wallet software on the first controller; connecting, using the asset agent and wallet software, the first controller to the identity network; and associating digital identifying information of the asset to the decentralized asset identifier on the identity network.

Example 6 includes the method of any one of examples 1 to 5, including or excluding optional features. In this example, endorsing the proposed transaction further comprises: retrieving the document associated with the decentralized asset identifier from the identity network; using content of the document including information found via one or more service endpoints to perform business logic required for endorsement; submitting an endorsed proposed transaction to an ordering service node; and committing the endorsed proposed transaction to the first blockchain network and the second blockchain network using the decentralized asset identifier.

Example 7 includes the method of any one of examples 1 to 6, including or excluding optional features. In this example, exchanging the first controller for the second controller further comprises: updating, by the first controller, the document associated with the decentralized asset identifier, wherein the first controller updates a controller attribute in the document to identify the second controller, and wherein the first controller populates, in the document, one or more public keys associated with the second controller and makes authorization updates that enable the second controller to modify the document.

Example 8 includes the method of any one of examples 1 to 7, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 9 is a system. The system includes one or more processors; and one or more computer-readable storage media storing program instructions which, when executed by the one or more processors, are configured to cause the one or more processors to perform a method according to any one of examples 1 to 8.

Example 10 is a computer program product. The computer program product comprising one or more computer readable storage media, and program instructions collectively stored on the one or more computer readable storage media, the program instructions comprising instructions configured to cause one or more processors to perform a method according to any one of examples 1 to 8.

What is claimed is:

1. A computer-implemented method for generating and employing decentralized asset identifiers for cross-blockchain network asset transfers, the method comprising:
   registering a decentralized asset identifier to an asset with a local asset identifier, wherein the decentralized asset identifier is immutable;
   endorsing a proposed transaction for transferring the asset from a first controller associated with a first blockchain network to a second controller associated with a second blockchain network, wherein the proposed transaction utilizes the decentralized asset identifier; and
   exchanging, in a document associated with the decentralized asset identifier and retrieved from an identity network, the first controller for the second controller.

2. The method of claim 1, wherein the decentralized asset identifier comprises a scheme portion, a method portion, and a hash of the local asset identifier.

3. The method of claim 1, wherein characteristics of the asset cannot be inferred from the decentralized asset identifier.

4. The method of claim 1, wherein the document associated with the decentralized asset identifier includes a public key, a controller identifier, one or more service endpoint identifiers, and authorization and delegation methods for the asset.

5. The method of claim 1, wherein registering the decentralized asset identifier further comprises:
   installing asset agent and wallet software on the first controller;
   connecting, using the asset agent and wallet software, the first controller to the identity network; and
   associating digital identifying information of the asset to the decentralized asset identifier on the identity network.

6. The method of claim 1, wherein endorsing the proposed transaction further comprises:
   retrieving the document associated with the decentralized asset identifier from the identity network;
   using content of the document including information found via one or more service endpoints to perform business logic required for endorsement;
   submitting an endorsed proposed transaction to an ordering service node; and
   committing the endorsed proposed transaction to the first blockchain network and the second blockchain network using the decentralized asset identifier.

7. The method of claim 1, wherein exchanging the first controller for the second controller further comprises:
   updating, by the first controller, the document associated with the decentralized asset identifier, wherein the first controller updates a controller attribute in the document to identify the second controller, and wherein the first controller populates, in the document, one or more public keys associated with the second controller and makes authorization updates that enable the second controller to modify the document.

8. The method of claim 1, wherein the method is performed by one or more computers according to software that is downloaded to the one or more computers from a remote data processing system.

9. The method of claim 8, wherein the method further comprises:
   metering a usage of the software; and
   generating an invoice based on metering the usage.

10. A system comprising:
    one or more processors; and
    one or more computer-readable storage media storing program instructions which, when executed by the one or more processors, are configured to cause the one or more processors to perform a method for generating and employing decentralized asset identifiers for cross-blockchain network asset transfers, the method comprising:
    registering a decentralized asset identifier to an asset with a local asset identifier, wherein the decentralized asset identifier is immutable;
    endorsing a proposed transaction for transferring the asset from a first controller associated with a first blockchain network to a second controller associated with a second blockchain network, wherein the proposed transaction utilizes the decentralized asset identifier; and
    exchanging, in a document associated with the decentralized asset identifier and retrieved from an identity network, the first controller for the second controller.

11. The method of claim 1, wherein the decentralized asset identifier comprises a scheme portion, a method portion, and a hash of the local asset identifier.

12. The system of claim 10, wherein the document associated with the decentralized asset identifier includes a public key, a controller identifier, one or more service endpoint identifiers, and authorization and delegation methods for the asset.

13. The system of claim 10, wherein registering the decentralized asset identifier further comprises:
    installing asset agent and wallet software on the first controller;
    connecting, using the asset agent and wallet software, the first controller to the identity network; and
    associating digital identifying information of the asset to the decentralized asset identifier on the identity network.

14. The system of claim 10, wherein endorsing the proposed transaction further comprises:
    retrieving the document associated with the decentralized asset identifier from the identity network;
    using content of the document including information found via one or more service endpoints to perform business logic for endorsement;
    submitting an endorsed proposed transaction to an ordering service node; and
    committing the endorsed proposed transaction to the first blockchain network and the second blockchain network using the decentralized asset identifier.

15. The system of claim 10, wherein exchanging the first controller for the second controller further comprises:
    updating, by the first controller, the document associated with the decentralized asset identifier, wherein the first controller updates a controller attribute in the document to identify the second controller, and wherein the first controller populates, in the document, one or more public keys associated with the second controller and makes authorization updates that enable the second controller to modify the document.

16. A computer program product comprising one or more computer readable storage media, and program instructions collectively stored on the one or more computer readable storage media, the program instructions comprising instructions configured to cause one or more processors to perform a method for generating and employing decentralized asset identifiers for cross-blockchain network asset transfers, the method comprising:
    registering a decentralized asset identifier to an asset with a local asset identifier, wherein the decentralized asset identifier is immutable;
    endorsing a proposed transaction for transferring the asset from a first controller associated with a first blockchain network to a second controller associated with a second blockchain network, wherein the proposed transaction utilizes the decentralized asset identifier; and
    exchanging, in a document associated with the decentralized asset identifier and retrieved from an identity network, the first controller for the second controller.

17. The computer program product of claim 16, wherein the decentralized asset identifier comprises a scheme portion, a method portion, and a hash of the local asset identifier, and wherein the document associated with the decentralized asset identifier includes a public key, a controller identifier, one or more service endpoint identifiers, and authorization and delegation methods for the asset.

18. The computer program product of claim 16, wherein registering the decentralized asset identifier further comprises:
    installing asset agent and wallet software on the first controller;
    connecting, using the asset agent and wallet software, the first controller to the identity network; and
    associating digital identifying information of the asset to the decentralized asset identifier on the identity network.

19. The computer program product of claim 16, wherein endorsing the proposed transaction further comprises:
    retrieving the document associated with the decentralized asset identifier from the identity network;
    using content of the document including information found via one or more service endpoints to perform business logic for endorsement;
    submitting an endorsed proposed transaction to an ordering service node; and
    committing the endorsed proposed transaction to the first blockchain network and the second blockchain network using the decentralized asset identifier.

20. The computer program product of claim 16, wherein exchanging the first controller for the second controller further comprises:
    updating, by the first controller, the document associated with the decentralized asset identifier, wherein the first controller updates a controller attribute in the document to identify the second controller, and wherein the first controller populates, in the document, one or more public keys associated with the second controller, and makes authorization updates that enable the second controller to modify the document.

\* \* \* \* \*